United States Patent
Gyasi

(10) Patent No.: US 9,787,808 B1
(45) Date of Patent: Oct. 10, 2017

(54) COMBINED COVER AND CHARGING CORD FOR A PORTABLE ELECTRONIC DEVICE AND ASSOCIATED USE THEREOF

(71) Applicant: King David Gyasi, Woodbridge, VA (US)

(72) Inventor: King David Gyasi, Woodbridge, VA (US)

( * ) Notice: Subject to any disclaimer, the term of this patent is extended or adjusted under 35 U.S.C. 154(b) by 0 days.

(21) Appl. No.: 15/162,364

(22) Filed: May 23, 2016

Related U.S. Application Data

(60) Provisional application No. 62/164,639, filed on May 21, 2015.

(51) Int. Cl.
| | |
|---|---|
| *H02B 1/20* | (2006.01) |
| *H04M 1/02* | (2006.01) |
| *H02J 7/00* | (2006.01) |
| *H04M 1/04* | (2006.01) |
| *H04B 1/3883* | (2015.01) |

(52) U.S. Cl.
CPC ......... *H04M 1/0274* (2013.01); *H02J 7/0044* (2013.01); *H04B 1/3883* (2013.01); *H04M 1/04* (2013.01)

(58) Field of Classification Search
CPC ...... H04M 1/0274; H04M 1/04; H02J 7/0044; H04B 1/3883
USPC .......................................................... 361/826
See application file for complete search history.

(56) References Cited

U.S. PATENT DOCUMENTS

| | | | | |
|---|---|---|---|---|
| 4,718,085 A * | 1/1988 | Haskins | ................ | H04M 1/15 174/175 |
| 6,091,224 A * | 7/2000 | Morita | ................ | H01M 10/46 320/113 |
| 7,580,266 B2 * | 8/2009 | Miller | ................ | A22B 5/0064 361/728 |
| 7,644,867 B2 * | 1/2010 | Lin | ................ | G06K 19/077 235/486 |
| D721,646 S * | 1/2015 | Kim | ................ | D13/103 |
| 9,153,985 B1 * | 10/2015 | Gjovik | ................ | H02J 7/0042 |

* cited by examiner

*Primary Examiner* — Hung S Bui

(57) ABSTRACT

A combined cover and power cord includes a cover adapted to fit around the existing portable electronic device. The cover has a posterior face provided with a groove. A flexible and deformable power cord is removably attached to the groove in such a manner that a first portion of the power cord is selectively peeled away from the posterior face while a remaining second portion maintains direct contact with the posterior face. Advantageously, an entire longitudinal length of the power cord is positioned at the posterior face when each of the first portion and the second portion are coplanar with the posterior face.

19 Claims, 6 Drawing Sheets

COMBINED COVER AND CHARGING CORD FOR A PORTABLE ELECTRONIC DEVICE AND ASSOCIATED USE THEREOF

CROSS REFERENCE TO RELATED APPLICATIONS

This is a non-provisional patent application that claims the benefit of U.S. provisional patent application No. 62/164,639 filed May 21, 2015, which is incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to smart phone covers and, more particularly, to a form-fitting smartphone case or cover that includes its own flush-mounted, "peel-away" USB/micro-USB charging cord thereby providing a shock-absorbent protection for the phone, as well as a spare USB/micro-USB charger cable, and a convenient, secure means for carrying the cable.

Prior Art

Whether world-changing inventions like cars or computers, or everyday conveniences like pump hairsprays, cordless tools, or resealable soda bottles, inventions are always the product of vision and creativity. Some inventions present us with a product that is entirely new, like a cellphone; and before long, such an invention literally changes the way we live. Other inventions combine two already-existing tools or products into one—a snow-scraper and brush, for example—thus reducing the clutter in our lives, and making (in this example, at least) our daily winter chores a little easier. Some inventions deal with common problems, as, for example, roll-on deodorants deal with body odors. Others—and again the cellphone is a good example—bring us so much convenience that we didn't know we needed them until they came into being. Many, if not most, inventions consist of relatively small but highly effective improvements of existing products or technologies.

Now a smartphone is useful only so long as its battery holds a sufficient charge; and while we can charge the phone at home with a plug-in charger; charge it in our car with an accessory charger; or charge it from the USB port of a laptop, PC, or tablet, most of us seldom carry our chargers (or USB cables) along with our phone.

Accordingly, a need remains for a multi-functional smart phone cover in order to overcome at least one aforementioned shortcoming. The exemplary embodiment(s) satisfy such a need by providing a form-fitting smartphone case or cover that includes its own flush-mounted, "peel-away" USB/micro-USB charging cord that is convenient and easy to use, lightweight yet durable in design, versatile in its applications, and designed to offer shock-absorbent protection for the phone, as well as provide a spare USB/micro-USB charger cable, and a convenient, secure means for carrying the cable. The invention disclosed in this report would correct this situation, enabling millions of smart-phone users to charge their phone's battery anywhere there's a USB-equipped device for a power source.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a combined cover and power cord for an existing portable electronic device. These and other objects, features, and advantages of the non-limiting exemplary embodiment(s) are provided by a combined cover and power cord including a cover adapted to fit around the existing portable electronic device. The cover includes a plurality of contiguous sides configured at an end-to-end pattern along a perimeter of the cover, and a posterior face integral with the contiguous sides and monolithically attached thereto. Such a posterior face is intermediately seated between the contiguous sides. A flexible and deformable power cord is removably attached to the posterior face of the cover in such a manner that a first portion and a second portion of the power cord is selectively peeled away from the posterior face while a remaining central portion maintains direct contact with the posterior face. Advantageously, an entire longitudinal length of the power cord is positioned at the posterior face when each of the first portion and the second portion are substantially coplanar with the posterior face.

In a non-limiting exemplary embodiment, the posterior face includes a non-linear groove spaced inwardly of the perimeter of the posterior face and the contiguous sides. Such a groove includes a proximal end having a first surface area, a non-linear medial section directly extended from the proximal end and disposed along a major longitudinal length of the groove wherein the medial section has a substantially uniform width, and a distal end directly extended from the medial section and disposed adjacent to the proximal end. Advantageously, the entire longitudinal length of the power cord is removably nested within the groove. Notably, the distal end has a second surface area smaller than the first surface area. Advantageously, a cross-strap is statically seated within the groove and positioned adjacent to the distal end.

In a non-limiting exemplary embodiment, the power cord includes a first conductive end located at the first portion and a second conductive end located at the second portion. Such a power cord is directly abutted against the cross-strap such that the first conductive end and the second conductive end each is removable from the groove while the central portion of the power cord remains attached to the major longitudinal length of the medial section of the groove.

In a non-limiting exemplary embodiment, the proximal end is generally centered at the posterior face. Notably, the distal end is disposed along a centrally registered longitudinal axis of the posterior face.

In a non-limiting exemplary embodiment, the power cord has a flat top surface substantially flush-mounted and substantially coplanar with the posterior face of the cover.

In a non-limiting exemplary embodiment, the cover is deformably resilient and is capable of being form-fitted about the existing portable electronic device.

In a non-limiting exemplary embodiment, each of the groove and the power cord is coextensively oriented along a serpentine shape located at the posterior face.

In a non-limiting exemplary embodiment, the first conductive end is removably nested within the proximal end of the groove, and the second conductive end is removably nested within the distal end of the groove.

In a non-limiting exemplary embodiment, the power cord includes a protective guard detachably positioned over a major longitudinal length of the power cord. Advantageously, each of the power cord and the protective guard are contemporaneously nested within the groove.

The present disclosure further includes a method of utilizing a combined cover and power cord with an existing portable electronic device. Such a method includes the initial steps of: providing an existing portable electronic device; and providing and fitting a cover around the existing portable electronic device. Such a cover includes a plurality of contiguous sides configured at an end-to-end pattern along a perimeter of the cover, and a posterior face integral with the contiguous sides and monolithically attached thereto. Such a posterior face is intermediately seated between the contiguous sides.

The method further includes the chronological steps of: providing and removably attaching a flexible and deformable power cord to the posterior face of the cover; positioning an entire longitudinal length of the power cord at the posterior face by situating each of a first portion of the power cord and a second portion of the power cord substantially coplanar with the posterior face; and selectively peeling away the first portion and the second portion of the power cord from the posterior face while a remaining central portion maintains direct contact with the posterior face.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Figure 1:
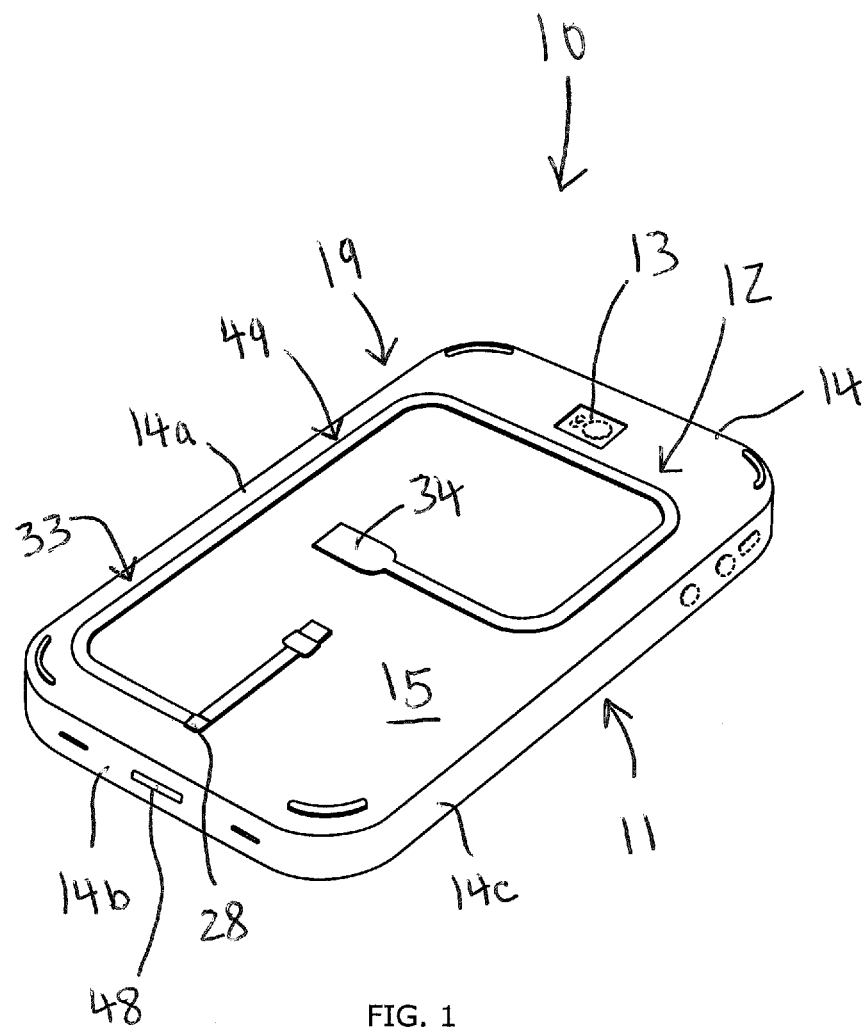
FIG. 1 is a perspective view of a posterior side of a combined cover and power cord attached to an existing electronic device, in accordance with a non-limiting exemplary embodiment.
Figure 2:
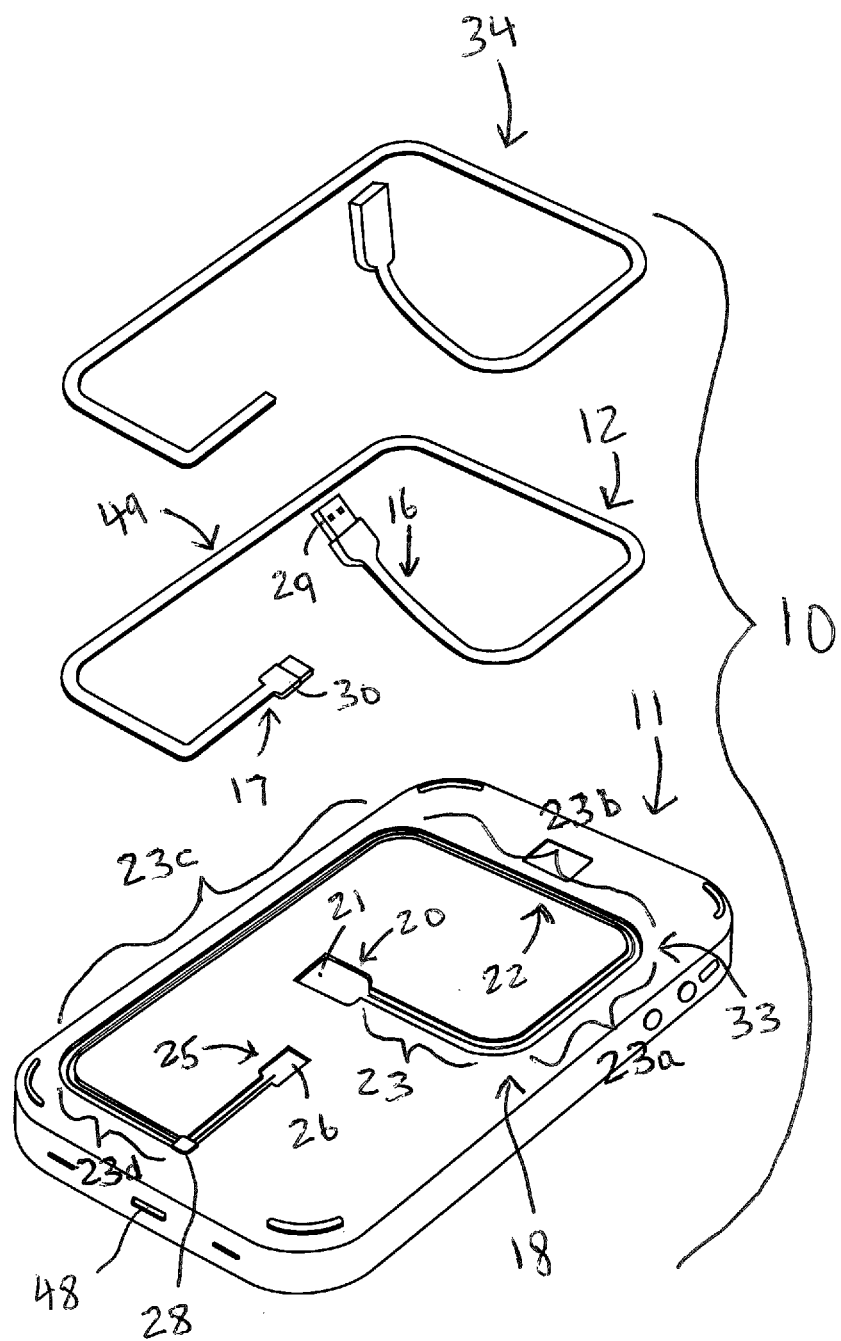
FIG. 2 is an exploded view showing the power cord detached from the groove at the posterior face of the cover.
Figure 3:
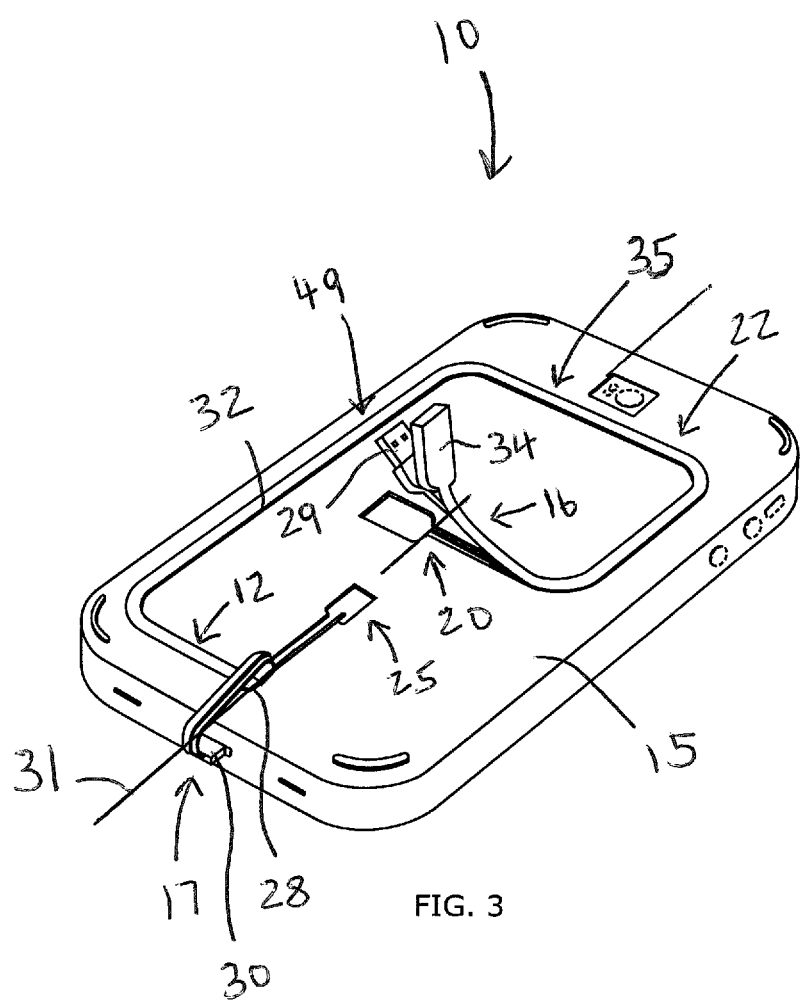
FIG. 3 is a perspective view showing the power cord of FIG. 1 partially peeled away from the groove of the cover.
Figure 4:
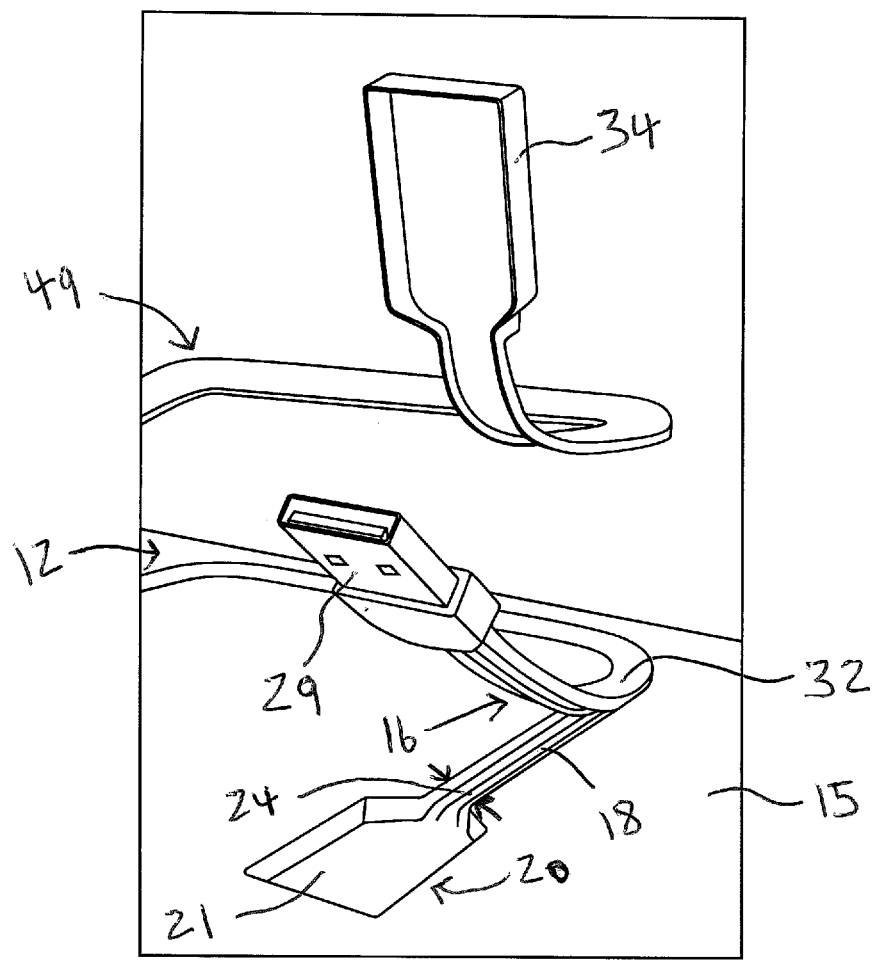
FIG. 4 is an enlarged perspective view of the first conductive end located at the first portion of the power cord.
Figure 5:
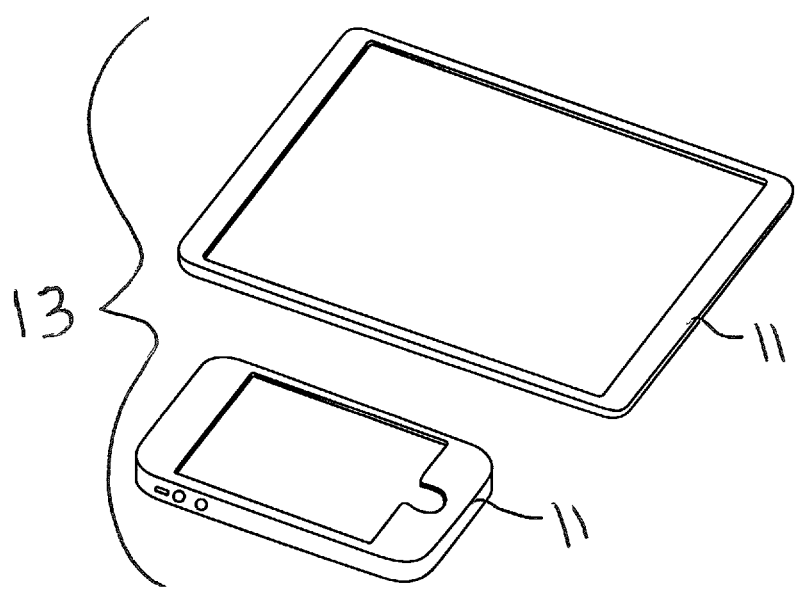
FIG. 5 are perspective views showing non-limiting exemplary embodiments of the combined cover and power cord attached to the electronic device.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about" means approximately or nearly and in the context of a numerical value or range set forth means±15% of the numerical.

If used herein, "substantially" means largely if not wholly that which is specified but so close that the difference is insignificant.

The terms "cable" and "cord" are interchangeably used throughout the disclosure. References made to "USB," "micro-USB" and similar terms are intended to define non-limiting exemplary embodiments of the "power cord 12." The terms "case" and "cover" are interchangeably used throughout the disclosure.

The non-limiting exemplary embodiment(s) is/are referred to generally in FIGS. 1-6 and is/are intended to provide a combined cover and power cord (collectively at 10) for an existing portable electronic device 13. The combined cover and power cord (collectively at 10) includes a cover 11 adapted to fit around the existing portable electronic device 13. The cover 11 includes a plurality of contiguous sides 14-14c configured at an end-to-end pattern along a perimeter 19 of the cover 11, and a posterior face 15 integral with the contiguous sides 14-14c and monolithically attached thereto. Such a posterior face 15 is intermediately seated between the contiguous sides 14-14c. A flexible and deformable power cord 12 is removably attached to the posterior face 15 of the cover 11 in such a manner that a first portion 16 and a second portion 17 of the power cord 12 each is selectively peeled away from the posterior face 15 while a remaining central portion 49 maintains direct contact with the posterior face 15. Advantageously, an entire longitudinal length of the power cord 12 is positioned at the posterior face 15 when each of the first portion 16 and the second portion 17 are substantially coplanar with the posterior face 15.

In a non-limiting exemplary embodiment, the posterior face 15 includes a non-linear groove 18 spaced inwardly of the perimeter 19 of the posterior face 15 and the contiguous sides 14-14c. Such a groove 18 includes a proximal end 20 having a first surface area 21, a non-linear medial section 22 directly extended from the proximal end 20 and disposed along a major longitudinal length 23-23e of the groove 18 wherein the medial section 22 has a substantially uniform width 24, and a distal end 25 directly extended from the medial section 22 and disposed adjacent to the proximal end 20. Advantageously, the entire longitudinal length of the power cord 12 is removably nested within the groove 18. Notably, the distal end 25 has a second surface area 26 smaller than the first surface area 21. Advantageously, a cross-strap 28 is statically seated within the groove 18 and positioned adjacent to the distal end 25.

In a non-limiting exemplary embodiment, the power cord 12 includes a first conductive end 29 located at the first portion 16 and a second conductive end 30 located at the second portion 17. Such a power cord 12 is directly abutted against the cross-strap 28 such that the first conductive end 29 and the second conductive end 30 each are removable from the groove 18 while the central portion 49 of the power cord 12 remains attached to the major longitudinal length 23-23e of the medial section 22 of the groove 18.

In a non-limiting exemplary embodiment, the proximal end 20 is generally centered at the posterior face 15. Notably, the distal end 25 is disposed along a centrally registered longitudinal axis 31 of the posterior face 15.

In a non-limiting exemplary embodiment, the power cord 12 has a flat top surface 32 substantially flush-mounted and substantially coplanar with the posterior face 15 of the cover 11.

In a non-limiting exemplary embodiment, the cover 11 is deformably resilient and is capable of being form-fitted about the existing portable electronic device 13.

In a non-limiting exemplary embodiment, each of the groove 18 and the power cord 12 is coextensively oriented along a serpentine shape 33 located at the posterior face 15.

In a non-limiting exemplary embodiment, the first conductive end 29 is removably nested within the proximal end 20 of the groove 18, and the second conductive end 30 is removably nested within the distal end 25 of the groove 18.

In a non-limiting exemplary embodiment, the power cord 12 includes a protective guard 34 detachably positioned over a major longitudinal length 35 (measured from first conductive end 29 and terminates just prior to reaching the second conductive end 30) of the power cord 12. Thus, guard 34 begins at first conductive end 29 and terminates just prior to reaching the second conductive end 30 of power cord 12. Advantageously, each of the power cord 12 and the protective guard 34 are contemporaneously nested within the groove 18.

The present disclosure further includes a method of utilizing a combined cover 11 and power cord 12 with an existing portable electronic device 13. Such a method includes the initial steps of: providing an existing portable electronic device 13; and providing and fitting a cover 11 around the existing portable electronic device 13. Such a cover 11 includes a plurality of contiguous sides 14-14c configured at an end-to-end pattern along a perimeter 19 of the cover 11, and a posterior face 15 integral with the contiguous sides 14-14c and monolithically attached thereto. Such a posterior face 15 is intermediately seated between the contiguous sides 14-14c.

The method further includes the chronological steps of: providing and removably attaching a flexible and deformable power cord 12 to the posterior face 15 of the cover 11; positioning an entire longitudinal length of the power cord 12 at the posterior face 15 by situating each of a first portion 16 and a second portion of the power cord 12 substantially coplanar with the posterior face 15; and selectively peeling away the first portion 16 and the second portion 17 of power cord 18 from the posterior face 15 while a remaining central portion 49 of the power cord 12 maintains direct contact with the posterior face 15.

A non-limiting exemplary embodiment(s) of the present disclosure is referred to generally in FIGS. 1-6 and is intended to provide a combined form-fitting smartphone case or cover 11 that includes its own flush-mounted, "peel-away" USB/micro-USB charging cord 12 (cover 11 and cord 12 are referenced collectively at 10) thereby providing a shock-absorbent protection for the phone 13, as well as a spare USB/micro-USB charger cable (cord 12), and a convenient, secure way for carrying the cable 12. It should be understood that the exemplary embodiment(s) may be used to protect a variety of electronic devices such as tablets and smart phones, for example, and should not be limited to any particular electronic device or any particular type of power cord 12 such as a USB cord described herein.

Referring to FIGS. 1-6 in general, in a non-limiting exemplary embodiment(s), the combined cover 11 and USB cord 12 (collectively at 10) presents smartphone users with a protective case or cover 11 for a smartphone 13 that would not only offer shock-absorbent protection for the phone 13, but also provide a spare USB/micro-USB charger cable 12, and a convenient, secure way for carrying (groove 18) the cable 13, detachably, on the back of the phone case 11. By combining the spare charging cable 12 and the case 11 into an integrated unit 10, the combined cover 11 and USB cord 12 ensures that smartphone users can recharge their phone's battery from any device or adapter equipped with a USB port—thus freeing them of the need to carry a charger along, or to carry a separate USB charging cable.

In a non-limiting exemplary embodiment, the combined cover 11 and USB cord 12 (collectively at 10) can be fabricated in molded rubber and/or a flexible plastic polymer. The form-fitting combined cover 11 and USB cord 12 (collectively at 10) can be produced in a variety of colors, textures, and patterns; and a variety of sizes accommodates the most popular smartphones currently on the market. The combined cover 11 and USB cord 12 (collectively at 10) may also be produced in several versions for the most popular tablet computers, thus greatly expanding the potential market for the combined cover 11 and USB cord 12 (collectively at 10). The combined cover 11 and USB cord 12 (collectively at 10) might also be produced for popular e-readers such as the KINDLE™, for example.

In a non-limiting exemplary embodiment, the combined cover 11 and USB cord 12 (collectively at 10) differs from conventional smartphone and tablet covers in that the posterior face 15 of the cover 11 is slightly thicker—perhaps 5 to 7 millimeters in total thickness. The posterior face 15 of the cover 11 can molded to incorporate a peripheral, serpentine groove 18 that will receive and securely hold the USB/micro-USB charging cable (power cord 13) specifically configured to the electronic device 13: IPHONE®, ANDROID®, GALAXY®, etc. The larger, USB-plug end 29 of the cable 12 will fit snugly into a dedicated niche or recess 20 in the upper center of the posterior face 15, with a sliding and/or snap-on guard 34 (attached to the cable) that protects end 29 when not in use. The cable 12, which is flat on top surface 32 to lie flush (coplanar) with the posterior face 15 of the cover 11, then follows and fits snugly into a form-fitting channel or groove 18 that partially runs down the center of the posterior face 15, then out to the side of the posterior face 15, up to the top of the posterior face 15, and around and down the other side of the posterior face 15, terminating to define a storage position of the micro-USB plug 30, which is itself held in place within a form-fitting niche 25.

Figure 6:
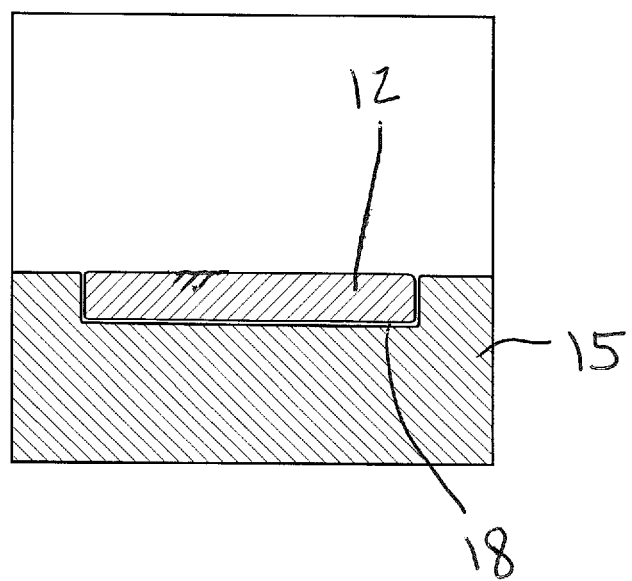
FIG. 6 is an enlarged cross-sectional view of a USB charging end of a power cord laying substantially coplanar and flush mounted with the posterior face of the cover.

In a non-limiting exemplary embodiment, the second portion 16 is secured by a tiny cross-strap 28 statically disposed at groove 18, which permits the user to plug the micro-USB connection 30 into the phone's charging port 48 while keeping the cable 12 secured to the groove 18. For added versatility, the combined cover 11 and USB cord 12 (collectively at 10) would also offer non-limiting exemplary embodiments to accommodate the backs of smartphones which offer wireless, induction-charging. A non-limiting exemplary embodiment of a power cord 12, groove 18 and posterior face 15' are illustrated in FIG. 6. Such an embodiment also displays a substantially flush-mounted and substantially coplanar configuration of the power cord 12' relative to the posterior face 15'.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. §1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. A combined cover and power cord for an existing portable electronic device, said combined cover and power cord comprising:
    a cover adapted to fit around the existing portable electronic device, said cover including
    a plurality of contiguous sides being configured at an end-to-end pattern along a perimeter of said cover,
    a posterior face being integral with said contiguous sides and monolithically attached thereto, said posterior face further being intermediately seated between said contiguous sides; and
    a power cord removably attached to said posterior face of said cover in such a manner that a first portion and a second portion of said power cord each is selectively peeled away from said posterior face while a remaining central portion maintains direct contact with said posterior face;
    wherein an entire longitudinal length of said power cord is positioned at said posterior face when each of said first portion and said second portion are substantially coplanar with said posterior face.

2. The combined cover and power cord of claim 1, wherein said posterior face comprises:
    a non-linear groove spaced inwardly of said perimeter of said posterior face and said contiguous sides, said groove including
    a proximal end having a first surface area,
    a non-linear medial section being directly extended from said proximal end and disposed along a major longitudinal length of said groove, said medial section having a substantially uniform width, and
    a distal end being directly extended from said medial section and disposed adjacent to said proximal end, said distal end having a second surface area smaller than said first surface area; and a cross-strap statically seated within said groove and adjacent to said distal end;

wherein the entire longitudinal length of said power cord is removably nested within said groove.

3. The combined cover and power cord of claim 2, wherein said power cord comprises: a first conductive end located at said first portion and a second conductive end located at said second portion, said power cord being directly abutted against said cross-strap such that said first conductive end and said second conductive end each is removable from said groove while said central portion of said power cord remains attached to the major longitudinal length of said medial section of said groove.

4. The combined cover and power cord of claim 3, wherein said proximal end is generally centered at said posterior face, wherein said distal end is disposed along a centrally registered longitudinal axis of said posterior face.

5. The combined cover and power cord of claim 1, wherein said power cord has a flat top surface substantially flush-mounted and substantially coplanar with said posterior face of said cover.

6. The combined cover and power cord of claim 1, wherein said cover is deformably resilient and is capable of being form-fitted about the existing portable electronic device.

7. The combined cover and power cord of claim 2, wherein each of said groove and said power cord is coextensively oriented along a serpentine shape located at said posterior face.

8. The combined cover and power cord of claim 3, wherein said first conductive end is removably nested within said proximal end of said groove;

wherein said second conductive end is removably nested within said distal end of said groove.

9. The combined cover and power cord of claim 1, wherein said power cord comprises: a protective guard detachably positioned over a major longitudinal length of said power cord;

wherein each of said power cord and said protective guard are contemporaneously nested within said groove.

10. A combined cover and power cord for an existing portable electronic device, said combined cover and power cord comprising:

a cover adapted to fit around the existing portable electronic device, said cover including a plurality of contiguous sides being configured at an end-to-end pattern along a perimeter of said cover, a posterior face being integral with said contiguous sides and monolithically attached thereto, said posterior face further being intermediately seated between said contiguous sides; and a power cord removably attached to said posterior face of said cover in such a manner that a first portion and a second portion of said power cord each is selectively peeled away from said posterior face while a remaining central portion maintains direct contact with said posterior face;

wherein an entire longitudinal length of said power cord is positioned at said posterior face when each of said first portion and said second portion are substantially coplanar with said posterior face;

wherein said power cord is flexible and deformable.

11. The combined cover and power cord of claim 10, wherein said posterior face comprises: a non-linear groove spaced inwardly of said perimeter of said posterior face and said contiguous sides, said groove including a proximal end having a first surface area, a non-linear medial section being directly extended from said proximal end and disposed along a major longitudinal length of said groove, said medial section having a substantially uniform width, and a distal end being directly extended from said medial section and disposed adjacent to said proximal end, said distal end having a second surface area smaller than said first surface area; and a cross-strap statically seated within said groove and adjacent to said distal end;

wherein the entire longitudinal length of said power cord is removably nested within said groove.

12. The combined cover and power cord of claim 11, wherein said power cord comprises: a first conductive end located at said first portion and a second conductive end located at said second portion, said power cord being directly abutted against said cross-strap such that said first conductive end and said second conductive end each is removable from said groove while said central portion of said power cord remains attached to the major longitudinal length of said medial section of said groove.

13. The combined cover and power cord of claim 12, wherein said proximal end is generally centered at said posterior face, wherein said distal end is disposed along a centrally registered longitudinal axis of said posterior face.

14. The combined cover and power cord of claim 10, wherein said power cord has a flat top surface substantially flush-mounted and substantially coplanar with said posterior face of said cover.

15. The combined cover and power cord of claim 10, wherein said cover is deformably resilient and is capable of being form-fitted about the existing portable electronic device.

16. The combined cover and power cord of claim 11, wherein each of said groove and said power cord is coextensively oriented along a serpentine shape located at said posterior face.

17. The combined cover and power cord of claim 12, wherein said first conductive end is removably nested within said proximal end of said groove;

wherein said second conductive end is removably nested within said distal end of said groove.

18. The combined cover and power cord of claim 10, wherein said power cord comprises: a protective guard detachably positioned over a major longitudinal length of said power cord;

wherein each of said power cord and said protective guard are contemporaneously nested within said groove.

19. A method of utilizing a combined cover and power cord with an existing portable electronic device, said method comprising the steps of:

providing an existing portable electronic device;

providing and fitting a cover around the existing portable electronic device, said cover including a plurality of contiguous sides configured at an end-to-end pattern along a perimeter of said cover, a posterior face integral with said contiguous sides and monolithically attached thereto, said posterior face further being intermediately seated between said contiguous sides;

providing and removably attaching a flexible and deformable power cord to said posterior face of said cover;

positioning an entire longitudinal length of said power cord at said posterior face by situating each of a first portion of said power and a second portion of said power cord substantially coplanar with said posterior face; and selectively peeling away said first portion and said second portion of said power cord from said posterior face while a remaining central portion of said power cord maintains direct contact with said posterior face.

* * * * *